United States Patent
Kaneko

(10) Patent No.: US 10,691,384 B2
(45) Date of Patent: Jun. 23, 2020

(54) IMAGE FORMING APPARATUS THAT PRINTS WHILE EXCLUDING ENCRYPTED PRINT DATA, CONTROL METHOD OF IMAGE FORMING APPARATUS, AND STORAGE MEDIUM

(71) Applicant: CANON KABUSHIKI KAISHA, Tokyo (JP)

(72) Inventor: Takayuki Kaneko, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/618,763

(22) Filed: Jun. 9, 2017

(65) Prior Publication Data

US 2017/0371601 A1 Dec. 28, 2017

(30) Foreign Application Priority Data

Jun. 23, 2016 (JP) ................................ 2016-124572

(51) Int. Cl.
*G06K 15/00* (2006.01)
*G06F 3/12* (2006.01)
(Continued)

(52) U.S. Cl.
CPC .......... *G06F 3/1238* (2013.01); *G06F 3/1204* (2013.01); *G06F 3/1222* (2013.01);
(Continued)

(58) Field of Classification Search
CPC .... G06F 3/1204; G06F 3/1222; G06F 3/1238; G06F 3/1247; G06F 3/1254;
(Continued)

(56) References Cited

U.S. PATENT DOCUMENTS 8,908,203 B2 * 12/2014 Kakutani ........... G06K 15/4095
358/1.14
9,036,172 B2 5/2015 Kotsuji
9,075,550 B2 7/2015 Kakutani
9,665,319 B2 5/2017 Nakajima
(Continued)

FOREIGN PATENT DOCUMENTS

JP 2005216133 A 8/2005
JP 2011223180 A 11/2011
(Continued)

OTHER PUBLICATIONS

Office Action issued in Japanese Appln. No. 2016-124572 dated Jan. 28, 2020. English translation provided.

*Primary Examiner* — Gabriel I Garcia
(74) *Attorney, Agent, or Firm* — Rossi, Kimms & McDowell LLP

(57) ABSTRACT

The image forming apparatus according to an embodiment of the present invention includes: an authentication unit configured to perform authentication of a user; and a job management unit configured to perform printing processing by executing a saved print job, and in the case where the user is authenticated by the authentication unit, the job management unit executes a print job for which a first printing method is specified of print jobs associated with the user without receiving a selection by the user and executes a print job for which a second printing method is specified of print jobs associated with the user by receiving a selection by the user.

19 Claims, 20 Drawing Sheets

(51) Int. Cl.
*H04N 1/00* (2006.01)
*G06F 21/60* (2013.01)
*H04N 1/32* (2006.01)
*H04N 1/23* (2006.01)
*H04N 1/21* (2006.01)
*H04N 1/44* (2006.01)

(52) U.S. Cl.
CPC .......... *G06F 3/1254* (2013.01); *G06F 3/1267* (2013.01); *G06F 21/608* (2013.01); *H04N 1/00233* (2013.01); *H04N 1/2108* (2013.01); *H04N 1/2338* (2013.01); *H04N 1/32101* (2013.01); *H04N 1/32363* (2013.01); *H04N 1/444* (2013.01); *H04N 1/4413* (2013.01); *H04N 2201/0082* (2013.01); *H04N 2201/3205* (2013.01); *H04N 2201/3222* (2013.01)

(58) Field of Classification Search
CPC .... G06F 3/1267; G06F 3/1285; G06F 3/1296; H04N 1/4413; H04N 1/444
USPC .......................................... 358/1.1–1.18, 402
See application file for complete search history.

(56) References Cited

U.S. PATENT DOCUMENTS

| | | | |
|---|---|---|---|
| 2003/0107756 A1* | 6/2003 | Dan | G06F 21/608 358/1.14 |
| 2005/0100378 A1* | 5/2005 | Kimura | G06F 3/1222 400/76 |
| 2006/0092453 A1* | 5/2006 | Okada | H04N 1/00411 358/1.14 |
| 2014/0320880 A1* | 10/2014 | Kotsuji | H04N 1/00838 358/1.13 |
| 2015/0317109 A1* | 11/2015 | Kirihata | H04N 1/00403 358/1.15 |
| 2016/0259602 A1* | 9/2016 | Dalaa | G06F 3/1204 |
| 2016/0371040 A1* | 12/2016 | Idehara | G06F 3/1238 |

FOREIGN PATENT DOCUMENTS

| | | |
|---|---|---|
| JP | 5282839 B2 | 9/2013 |
| JP | 2014142867 A | 8/2014 |
| JP | 2014159123 A | 9/2014 |
| JP | 2015009432 A | 1/2015 |
| JP | 5844306 B2 | 1/2016 |

* cited by examiner

1000 BIBLIOGRAPHIC INFORMATION LIST

| DATE AND TIME | USER NAME | STORAGE LOCATION | PRINT JOB NAME | JOB TYPE | PRINTED FLAG |
|---|---|---|---|---|---|
| 1001 | 1002 | 1003 | 1004 | 1005 | 1006 |
| 2012/4/10 9:00 | Kaneko | /data/Kaneko | AAA.txt | NON-ENCRYPTED PRINT JOB | PRINTED ← 1007 |
| 2012/4/10 9:05 | Nakajima | /data/Nakajima | BBB.pdf | NON-ENCRYPTED PRINT JOB | UNPRINTED ← 1008 |
| 2012/4/10 10:00 | Kaneko | /data/Kaneko | CCC.doc | NON-ENCRYPTED PRINT JOB | UNPRINTED ← 1009 |
| 2012/4/10 10:00 | Kaneko | /data/Kaneko | DDD.doc | NON-ENCRYPTED PRINT JOB | UNPRINTED ← 1010 |
| 2012/4/10 11:00 | Kaneko | /data/Kaneko | EEE.doc | ENCRYPTED PRINT JOB | UNPRINTED ← 1011 |
| 2012/4/10 11:00 | Kaneko | /data/Kaneko | FFF.doc | ENCRYPTED PRINT JOB | UNPRINTED ← 1012 |

1300 BIBLIOGRAPHIC INFORMATION LIST

| 1301 DATE AND TIME | 1302 USER NAME | 1303 STORAGE LOCATION | 1304 PRINT JOB NAME | 1305 JOB TYPE | 1306 PRINTED FLAG |
|---|---|---|---|---|---|
| 2012/4/10 10:00 | Kaneko | /data/Kaneko | CCC.doc | NON-ENCRYPTED PRINT JOB | UNPRINTED | ← 1009
| 2012/4/10 10:00 | Kaneko | /data/Kaneko | DDD.doc | NON-ENCRYPTED PRINT JOB | UNPRINTED | ← 1010
| 2012/4/10 11:00 | Kaneko | /data/Kaneko | EEE.doc | ENCRYPTED PRINT JOB | UNPRINTED | ← 1011
| 2012/4/10 11:00 | Kaneko | /data/Kaneko | FFF.doc | ENCRYPTED PRINT JOB | UNPRINTED | ← 1012

FIG.15

1500 BIBLIOGRAPHIC INFORMATION LIST

| DATE AND TIME | USER NAME | STORAGE LOCATION | PRINT JOB NAME | JOB TYPE | PRINTED FLAG |
|---|---|---|---|---|---|
| 2012/4/10 10:00 | Kaneko | /data/Kaneko | CCC.doc | NON-ENCRYPTED PRINT JOB | UNPRINTED ← 1009 |
| 2012/4/10 10:00 | Kaneko | /data/Kaneko | DDD.doc | NON-ENCRYPTED PRINT JOB | UNPRINTED ← 1010 |

FIG.16

1600 BIBLIOGRAPHIC INFORMATION LIST

| DATE AND TIME | USER NAME | STORAGE LOCATION | PRINT JOB NAME | JOB TYPE | PRINTED FLAG |
|---|---|---|---|---|---|
| 2012/4/10 9:00 | Kaneko | /data/Kaneko | AAA.txt | NON-ENCRYPTED PRINT JOB | PRINTED |
| 2012/4/10 9:05 | Nakajima | /data/Nakajima | BBB.pdf | NON-ENCRYPTED PRINT JOB | UNPRINTED |
| 2012/4/10 10:00 | Kaneko | /data/Kaneko | CCC.doc | NON-ENCRYPTED PRINT JOB | PRINTED |
| 2012/4/10 10:00 | Kaneko | /data/Kaneko | DDD.doc | NON-ENCRYPTED PRINT JOB | PRINTED |
| 2012/4/10 11:00 | Kaneko | /data/Kaneko | EEE.doc | ENCRYPTED PRINT JOB | UNPRINTED |
| 2012/4/10 11:00 | Kaneko | /data/Kaneko | FFF.doc | ENCRYPTED PRINT JOB | UNPRINTED |

1607, 1608, 1609, 1610, 1611, 1612

1700 PRINT JOB LIST

| DATE AND TIME | JOB NAME | STATE |
|---|---|---|
| 1701 — 2012/4/10  9:00 | AAA.txt | PRINTED |
| 1702 — 2012/4/10 10:00 | CCC.doc | PRINTED |
| 1703 — 2012/4/10 10:00 | DDD.doc | PRINTED |
| 1704 — 2012/4/10 11:00 | EEE.doc | UNPRINTED |
| 1705 — 2012/4/10 11:00 | FFF.doc | UNPRINTED |

DELETE ~1710            PRINT ~1711

FIG.17

IMAGE FORMING APPARATUS THAT PRINTS WHILE EXCLUDING ENCRYPTED PRINT DATA, CONTROL METHOD OF IMAGE FORMING APPARATUS, AND STORAGE MEDIUM

BACKGROUND OF THE INVENTION

Field of the Invention

The present invention relates to an image forming apparatus capable of printing a saved print job at timing of printing specified by a user, a control method of the image forming apparatus, and a storage medium.

Description of the Related Art

In recent years, an image forming apparatus is known, which temporarily saves and holds a print job input from a printer driver in a hard disk within the image forming apparatus and after authenticating a user, performs printing processing by executing the held print job aiming at preventing information leakage and the like. The image forming apparatus such as this saves and manages bibliographic information relating to a print job at the time of saving the print job. After authenticating a user, the image forming apparatus displays a print job list of the user on an operation unit based on the saved bibliographic information. By the user selecting a desired print job from the displayed print job list and giving instructions to perform printing, the image forming apparatus executes the selected print job.

Further, an image forming apparatus has been proposed (see Japanese Patent Laid-Open No. 2011-223180) that omits the selection operation by a user and automatically starts printing (post-login automatic printing) after authenticating the user in the case where a print job of the user is saved in order to reduce the burden of the operation of the user.

On the other hand, there is a case where a print job saved in the image forming apparatus is encrypted and in order to execute the encrypted print job, it is necessary to decode the print job with a password. However, Japanese Patent Laid-Open No. 2011-223180 does not disclose a control technique for an encrypted print job at the time of performing post-login automatic printing processing.

SUMMARY OF THE INVENTION

The image forming apparatus according to an embodiment of the present invention includes: an authentication unit configured to perform authentication of a user; and a job management unit configured to perform printing processing by executing a saved print job, and in a case where the user is authenticated by the authentication unit, the job management unit executes a print job for which a first printing method is specified of print jobs associated with the user without receiving a selection by the user and executes a print job for which a second printing method is specified of print jobs associated with the user by receiving a selection by the user.

Further features of the present invention will become apparent from the following description of exemplary embodiments with reference to the attached drawings.

BRIEF DESCRIPTION OF THE DRAWINGS

FIG. 10 is a diagram showing an example of a bibliographic information list in the first embodiment;

FIG. 13 is a diagram showing an example of a bibliographic information list generated by extracting unprinted jobs of a logged-in user in the first embodiment;

FIG. 15 is a diagram showing an example of a bibliographic information list generated by removing encrypted print jobs in the first embodiment;

FIG. 16 is a diagram showing an example of a bibliographic information list after execution of print jobs in the first embodiment;

FIG. 17 is a diagram showing an example of a display screen of a print job list in the first embodiment;

DESCRIPTION OF THE EMBODIMENTS

In the following, embodiments of the present invention are explained in detail with reference to the drawings. The embodiments explained below are merely exemplary and not intended to limit the present invention.

First Embodiment

In the present embodiment, processing in which a PC (Personal Computer) transmits a print job to an image forming apparatus and processing in which the image forming apparatus stores and holds the received print job in an auxiliary storage device are explained. Here, it is assumed that the print jobs that are stored in the auxiliary storage device include an encrypted print job whose data is encrypted and which needs to be decoded for execution and a non-encrypted print job whose data is not encrypted. Further, post-login automatic printing processing is explained in which the image forming apparatus performs printing processing by automatically executing a print job that is stored and held in the auxiliary storage device at the time of login of a user to the image forming apparatus. That is, the image forming apparatus according to the present embodiment includes a post-login automatic printing function to automatically execute a print job of a logged-in user.

Figure 1:
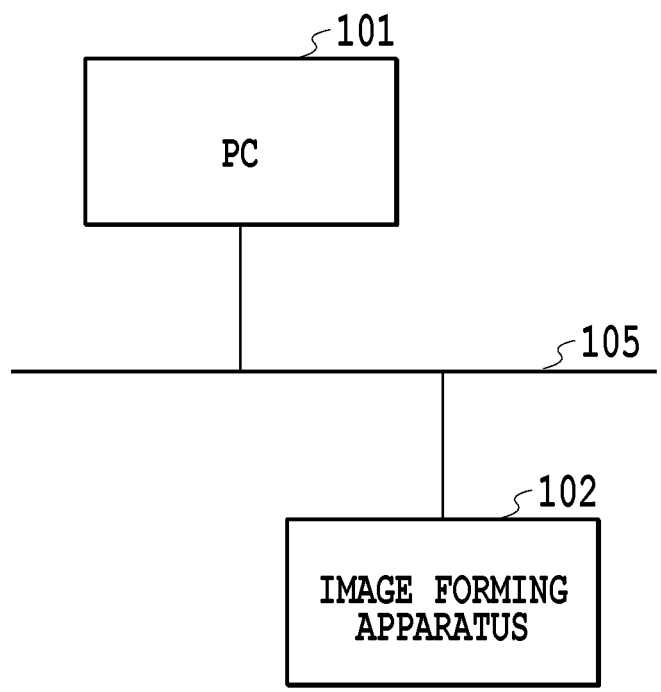
FIG. 1 is a diagram showing an example of a network configuration in a first embodiment.

FIG. 1 shows an example of a network configuration in the present embodiment. To a LAN (Local Area Network) 105, a PC (Personal Computer) 101 that inputs a print job and an image forming apparatus 102 that processes an input print job are connected. The number of PCs and the number of image forming apparatuses that are connected to the LAN 105 are not limited to those. The image forming apparatus 102 manages bibliographic information including identification information to uniquely specify the print job input from the PC 101. The bibliographic information may be managed by a storage device other than the image forming apparatus. In the present embodiment, the source from which a print job is input is the PC 101, but the source may be an apparatus or a device (e.g., a mobile terminal, another image forming apparatus, and so on) other than the PC.

Figure 2:
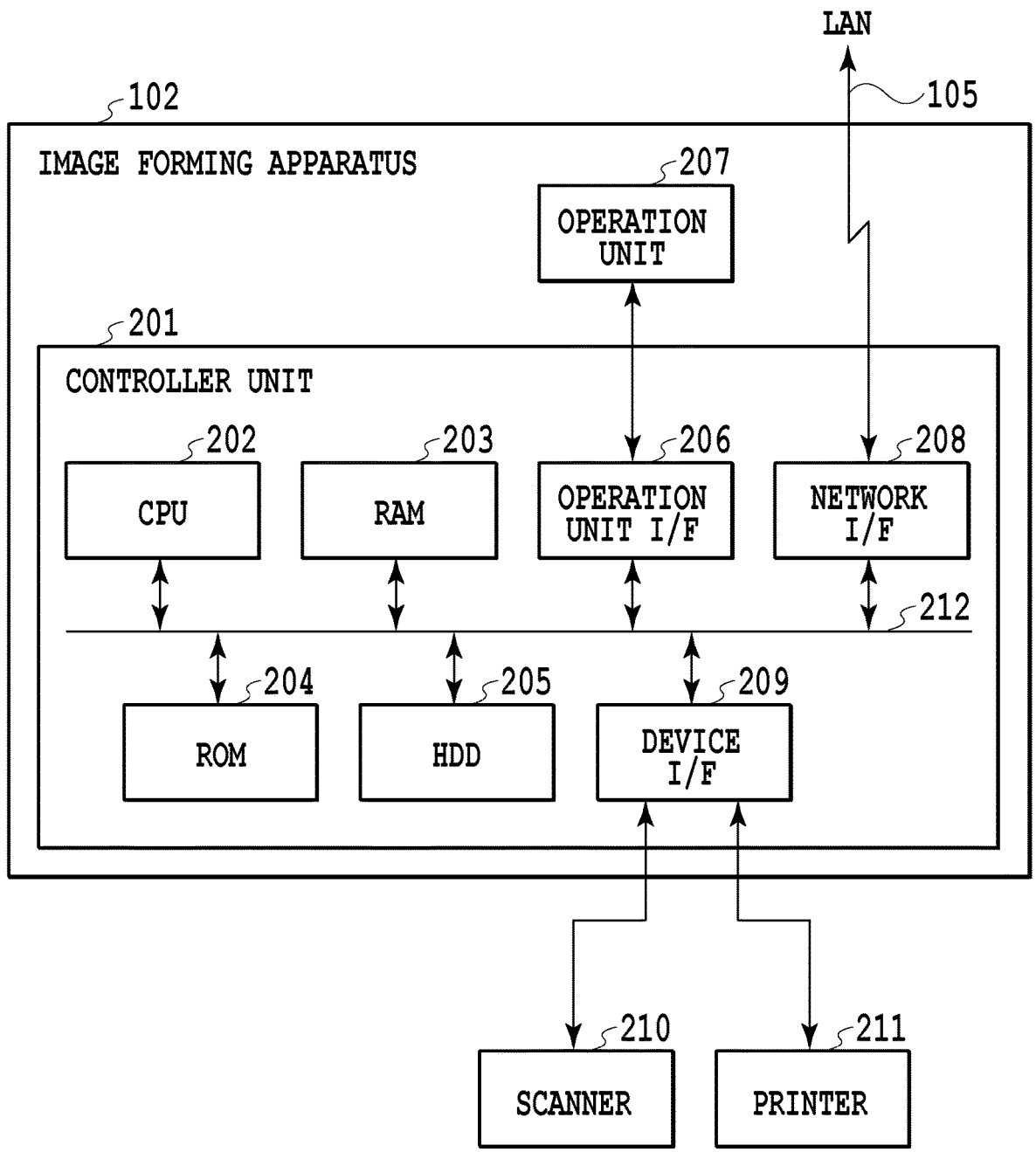
FIG. 2 is a block diagram showing a hardware configuration of an image forming apparatus in the first embodiment.

FIG. 2 is a block diagram showing an entire configuration of the image forming apparatus 102 in the present embodiment. In a controller unit 201 within the image forming apparatus 102, a CPU (Central Processing Unit) 202 is a calculation device that controls the entire system. A RAM (Random Access Memory) 203 is a system work memory for the CPU 202 to operate and is also an image memory to temporarily store image data. Further, the RAM 203 also stores an operating system, programs, such as system software and application software, and data. A ROM (Read Only Memory) 204 stores a boot program of the system. A hard disk drive (HDD) 205 stores an operating system, system software, application software, image data, setting data, and so on. An operation unit interface (I/F) 206 is an interface unit with an operation unit 207 and outputs information that is displayed on the operation unit 207 to the operation unit 207. Further, the operation unit I/F 206 receives information input by a user from the operation unit 207. A network I/F 208 connects to the network (LAN) 105 and inputs and outputs information from and to a PC and another image forming apparatus connected on the same LAN. A device I/F 209 connects a scanner 210 and a printer 211, which are an image input device and an image output device, respectively, and the controller unit 201 and inputs and outputs image data. The devices such as these are arranged on a system bus 212.

Figure 3:
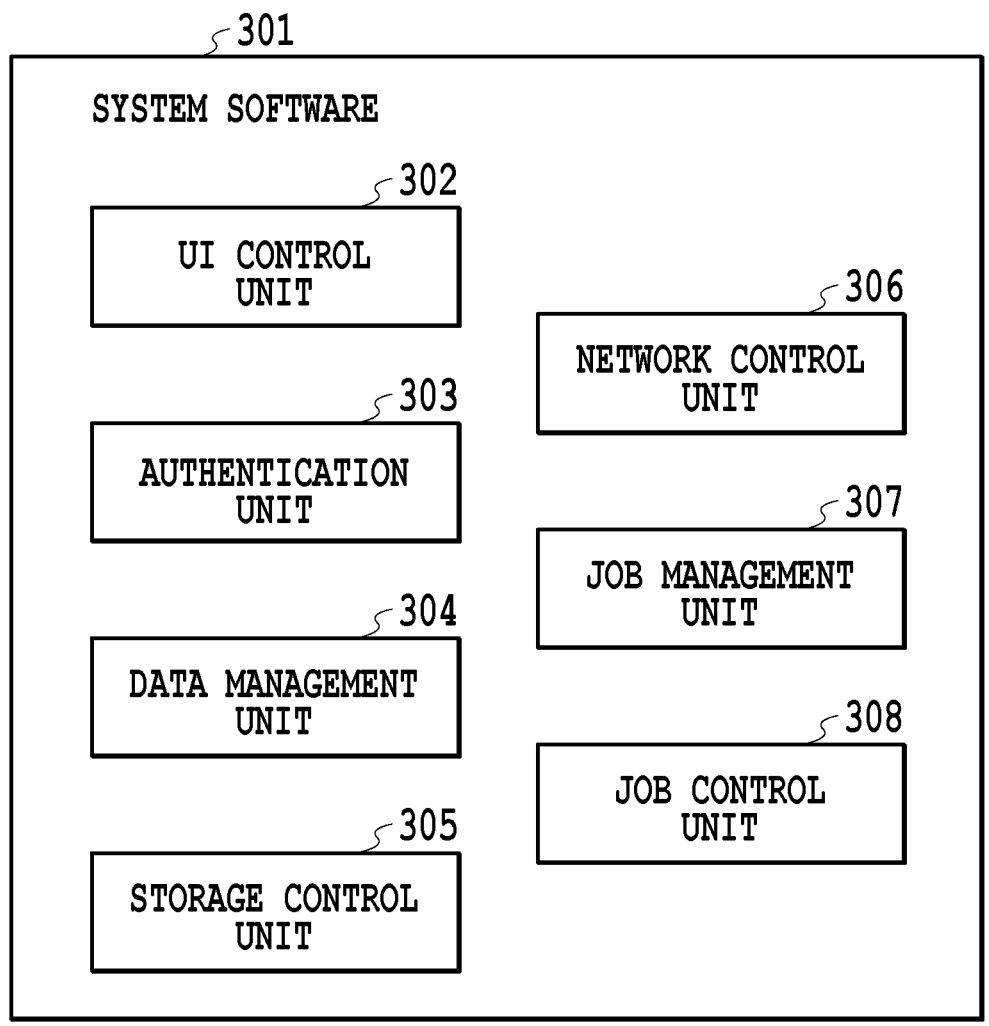
FIG. 3 is a block diagram showing a function configuration of system software of the image forming apparatus in the first embodiment.

FIG. 3 is a block diagram showing a function configuration of system software of the image forming apparatus 102 in the present embodiment.

System software 301 is stored in the storage unit, such as the RAM 203, the ROM 204, and the HDD 205, and executed by the CPU 202.

A user interface (UI) control unit 302 receives information that a user inputs by the operation unit 207 via the operation unit I/F 206 and transmits the information to an authentication unit 303, a data management unit 304, and a job management unit 307. Further, the UI control unit 302 receives a response from the authentication unit 303, the data management unit 304, and the job management unit 307 and outputs the information to the operation unit 207 via the operation unit I/F 206.

The authentication unit 303 performs user authentication processing based on the authentication information received from the UI control unit 302 and returns the results of the processing.

The data management unit 304 receives a request for data write and read from the UI control unit 302, the network control unit 306, and the job management unit 307 and transmits the request for data write and read to a storage control unit 305. Further, the data management unit 304 receives a response from the storage control unit 305 and transmits the information to the UI control unit 302, a network control unit 306, and the job management unit 307.

The storage control unit 305 receives a request for data write and read from the data management unit 304 and performs data write and read for the HDD 205 and returns the results of the data write and read to the data management unit 304.

The network control unit 306 receives a request from the PC 101 and another image forming apparatus connected on the LAN 105 via the network I/F 208. Then, the network control unit 306 makes a request for processing to the data management unit 304 and the job management unit 307 in accordance with the received request. Further, the network control unit 306 receives a response from the data management unit 304 and the job management unit 307. Then, the network control unit 306 transmits the received response to the PC 101 and another image forming apparatus connected on the LAN 105 via the network I/F 208.

The job management unit 307 receives a request for job execution from the UI control unit 302 and the network control unit 306 and manages jobs. Then, the job management unit 307 makes a request for job execution to a job control unit 308. Further, the job management unit 307 transmits a request for data write and read to the data management unit 304. Furthermore, the job management unit 307 receives a response from the data management unit 304 and the job control unit 308 and transmits the state of a job to the UI control unit 302 and the network control unit 306.

The job control unit 308 receives the request for job execution from the job management unit 307 and controls the operation of the scanner 210 and the printer 211 via the device I/F 209. Further, the job control unit 308 receives the operation state of the scanner 210 and the printer 211 via the device I/F 209 and transmits the operation state to the job management unit 307.

Figure 4:
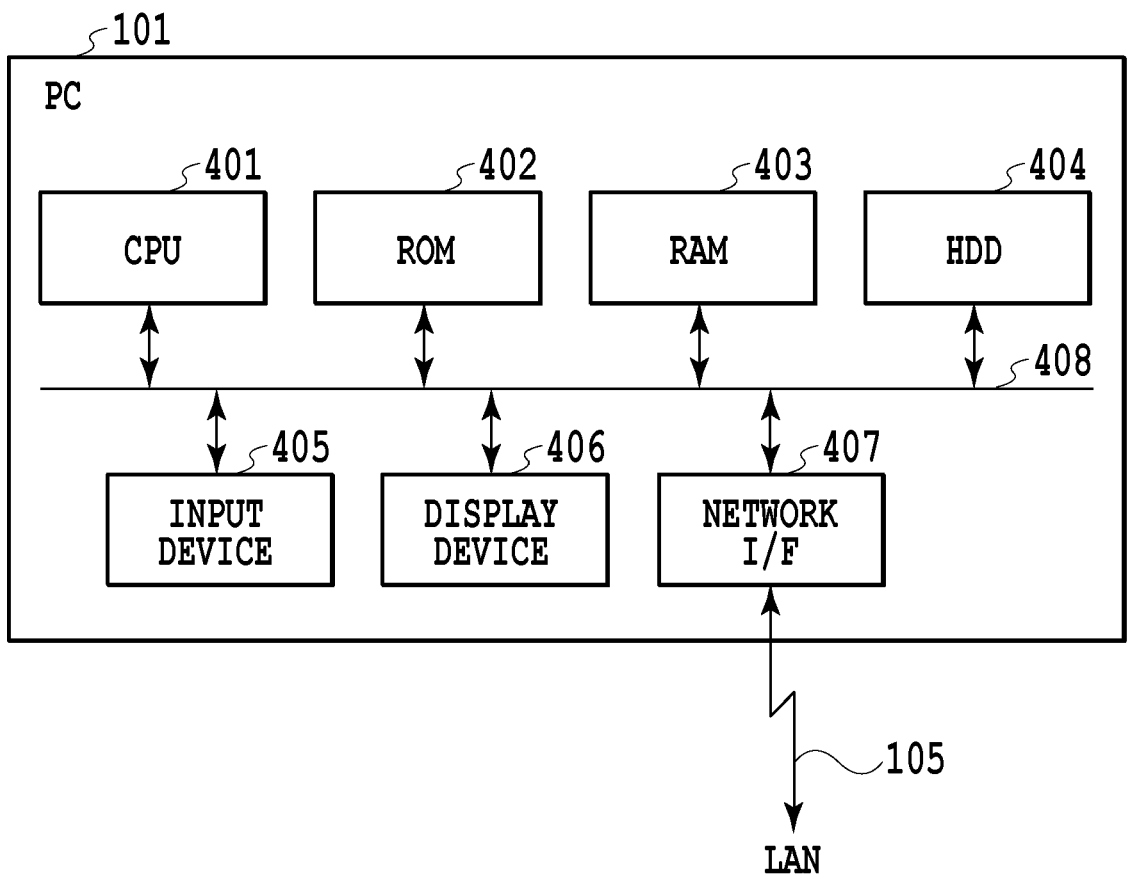
FIG. 4 is a block diagram showing a hardware configuration of a PC in the first embodiment.

FIG. 4 is a block diagram showing an entire configuration of the PC 101 in the present embodiment. In the PC 101, a CPU 401 is a calculation device that controls the entire system. A ROM 402 stores programs and data relating to each piece of processing. A RAM 403 is a system work memory for the CPU 401 to operate and is also a storage memory to store temporal data relating to each piece of processing. A hard disk drive (HDD) 404 stores programs, data, temporal data, application data, and so on, relating to each piece of processing. An input device 405 is a keyboard or a pointing device that receives instructions input to the PC 101. A display device 406 displays the operation situation of the CPU 101 and information output by each program that runs on the PC 101. A network I/F 407 connects to the network (LAN) 105 and inputs and outputs information to and from another PC and another image forming apparatus connected on the same LAN. These components are arranged on a system bus 408.

The functions (or processing) by the OS and a printer driver are implemented by the CPU 401 performing processing based on programs corresponding to the operating system (OS), the printer driver, and applications stored in the HDD 404.

Figure 5:
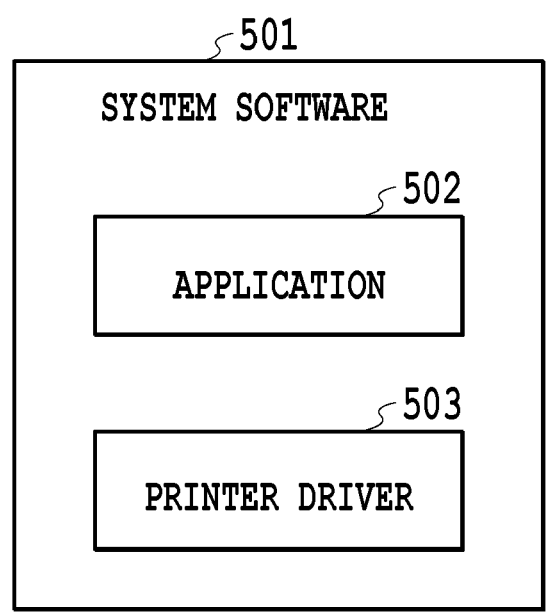
FIG. 5 is a block diagram showing a configuration of system software of the PC in the first embodiment.

FIG. 5 is a block diagram showing a configuration of system software of the PC 101 in the present embodiment.

System software 501 is stored in the storage unit, such as the ROM 402, the RAM 403, and the HDD 404, and executed by the CPU 401.

The system software 501 includes an application 502 and a printer driver 503. The application 502 is a tool for a user to, for example, create and edit an image and a document by using the input device 405, such as a pointing device and a keyboard, while watching the display device 406 of the PC 101. A user creates data of an image, a document, and so on, by using the application 502, creates print command data by using the printer driver 503, and transmits the data to an apparatus capable of printing, such as the image forming apparatus 102.

(Print Job Input Processing)

Figure 6:
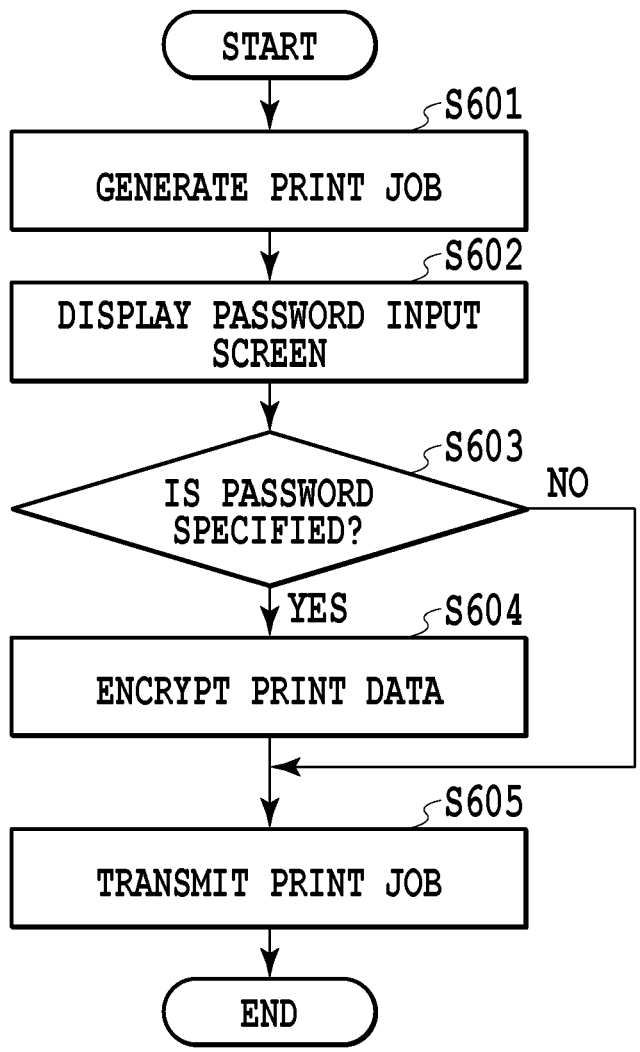
FIG. 6 is a flowchart explaining print job input processing in the first embodiment.

FIG. 6 shows a flowchart explaining print job input processing in the present embodiment. This processing is performed by the PC 101, i.e., by the CPU 401 of the PC 101 executing the system software 501, such as the application 502 and the printer driver 503. In the following explanation, it is assumed that a print job is input to the image forming apparatus 102 from the PC 101.

First, at step S601, the PC 101 generates a print job in accordance with instructions input by a user. A user creates data of an image, a document, and so on, by the application 502 by using the input device 405, such as a pointing device and a keyboard, while watching the display device 406 and gives instructions to perform printing. The printer driver 503 creates a print job in accordance with data of an image, a document, and so on, the document attribute, such as a document name, and print setting information set to the printer driver 503 at the time of giving instructions to perform printing.

Figure 7:
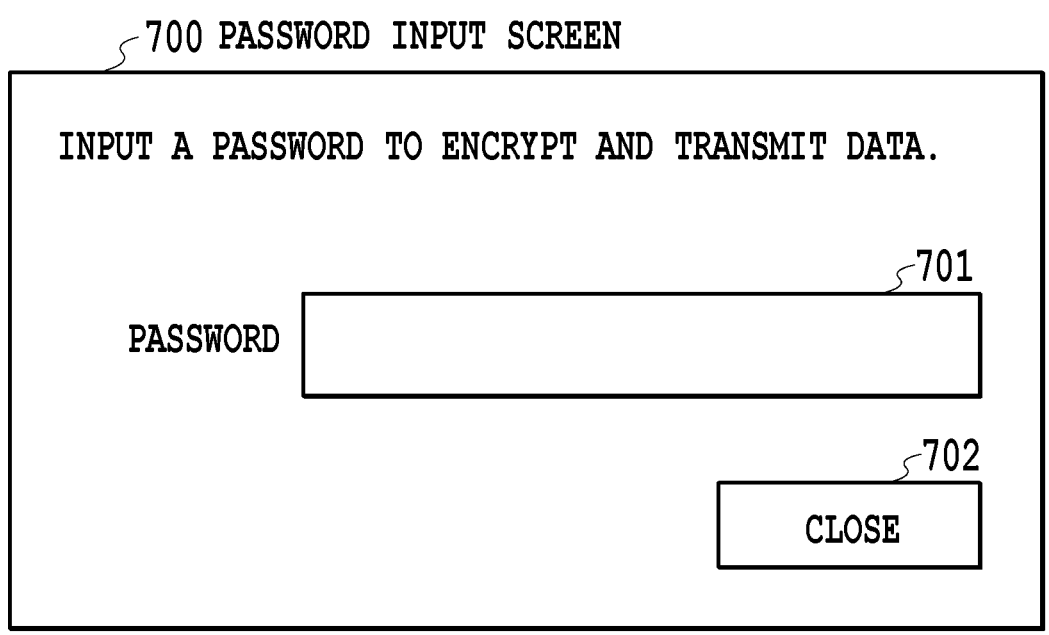
FIG. 7 is a diagram showing an example of an encryption password input screen of a print job in the first embodiment.

Next, at step S602, the PC 101 displays a print job password input screen 700 shown in FIG. 7. A password input area 701 is an area for a user to input an encryption key in the case of encrypting a print job. A button 702 is a button for a user to close the password input screen 700.

At step S603, in the case where a user presses down the button 702 on the password input screen 700, the PC 101 determines whether a password has been input to the password input area 701. In the case where a password has been input, the processing advances to step S604 and the PC 101 encrypts the print data portion of the print job with the input password. The data configuration of the print job including the print data portion will be described later with reference to FIG. 8. Next, at step S605, the PC 101 transmits the print job whose print data portion has been encrypted (encrypted print job) to the image forming apparatus 102 and terminates the processing.

On the other hand, in the case where it is determined that a password has not been input at step S603, the processing advances to step S605 and the PC 101 transmits the print job (non-encrypted print job) to the image forming apparatus 102 without encrypting the print data portion of the print job and terminates the processing.

Figure 8:
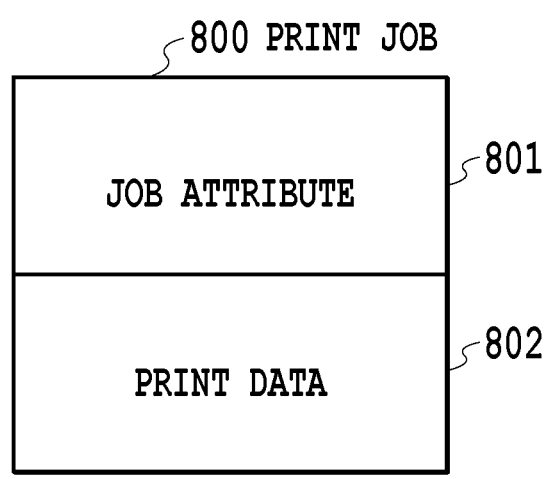
FIG. 8 is a diagram showing an example of a data configuration of a print job in the first embodiment.

FIG. 8 is a diagram showing an example of a data configuration of a print job in the present embodiment. A print job 800 includes a job attribute 801 and a print data portion 802. The job attribute 801 includes bibliographic information on the print job (print job name, print job user name, encryption flag indicating whether or not encryption processing has been applied, and so on) and job settings (specification of number of copies, specification of both-side printing, specification of stapling, and so on). The print data portion 802 includes information, such as bitmap data that is actually printed and vector data of a rectangle. In the present embodiment, in the encrypted print job that is encrypted and which needs to be decoded for execution, the print data portion 802 is encrypted and information indicating whether or not the print data portion 802 is encrypted is included in the job attribute 801.

(Print Job Saving Processing)

Figure 9:
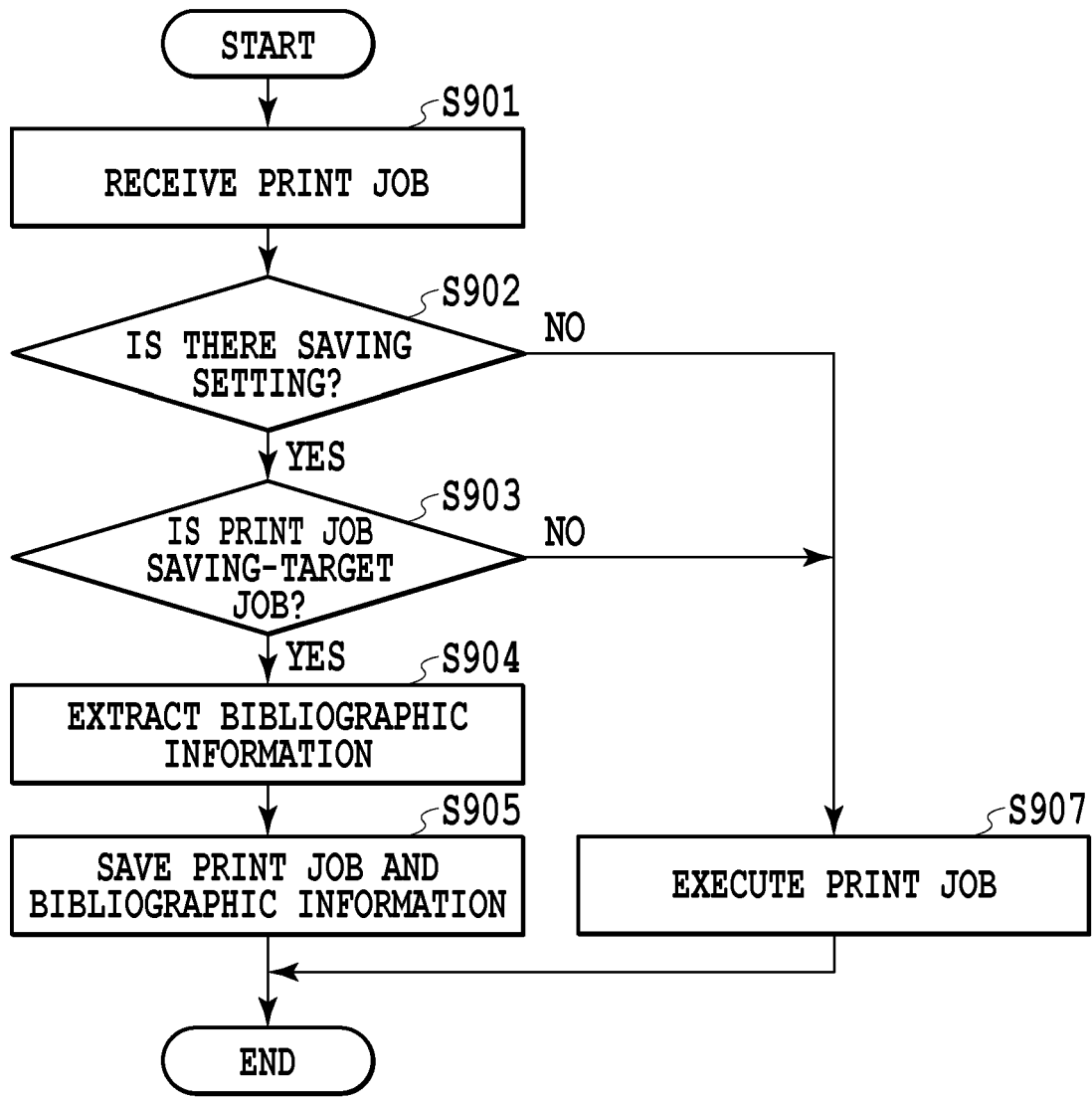
FIG. 9 is a flowchart explaining print job saving processing in the first embodiment.

FIG. 9 shows a flowchart explaining print job saving processing in the present embodiment. This processing is performed by the image forming apparatus 102, i.e., by the CPU 202 of the image forming apparatus 102 executing the system software 301. In the present embodiment, it is assumed that a print job transmitted from the PC 101 is saved by the image forming apparatus 102.

First, at step S901, the network control unit 306 of the image forming apparatus 102 receives a print job from the PC 101 and transmits the print job to the job management unit 307. At step S902, the job management unit 307 determines whether or not there is a saving setting of the print job in the image forming apparatus 102. The saving setting of a print job is set for each image forming apparatus and the storage control unit 305 stores the saving setting in the HDD 205, the RAM 203, and so on.

In the case where there is no saving setting of the print job, the processing advances to step S907 and the job management unit 307 makes a request for execution of the print job to the job control unit 308 and executes the print job.

On the other hand, in the case where there is a saving setting of the print job, the processing advances to step S903, and the job management unit 307 analyzes the print job and determines whether or not the print job is a saving-target job. For example, in the case where information (job attribute 801) attached to the print job, for example, such as a print job name to identify the print job, a print job user name, and identification information on a PC that executes the print job, coincides with conditions determined in advance, the job management unit 307 determines that the print job is a saving-target job. Alternatively, even in the case where the information does not coincide with the conditions such as those, it may also be possible to determine the print job to be a saving-target job.

In the case where the print job is not a saving-target job, the processing advances to step S907 and the job management unit 307 makes a request for execution of the print job to the job control unit 308 and executes the print job. On the other hand, in the case where the print job is a saving-target job, the job management unit 307 transmits the print job to the data management unit 304 and the processing advances to step S904.

At step S904, the data management unit 304 analyzes the print job received from the job management unit 307 and extracts bibliographic information, and transmits the print job and the extracted bibliographic information to the storage control unit 305.

At step S905, the storage control unit 305 saves the received print job and the extracted bibliographic information in the HDD 205 and terminates the processing.

FIG. 10 shows an example of a bibliographic information list in the present embodiment. A bibliographic information list 1000 is a list of bibliographic information 1007 to 1012 extracted from a print job and may be stored in the form of a data table. The bibliographic information list 1000 includes Date and time 1001 indicating a data and time at which a print job is input, User name 1002 indicating a user who inputs a print job, Storage location 1003 indicating the storage location of an input print job, Print job name 1004, Job type (encryption flag) 1005, and Printed flag 1006.

As explained above, by the image forming apparatus 102, the print job saving processing is performed.

(Login Processing)

Figure 11:
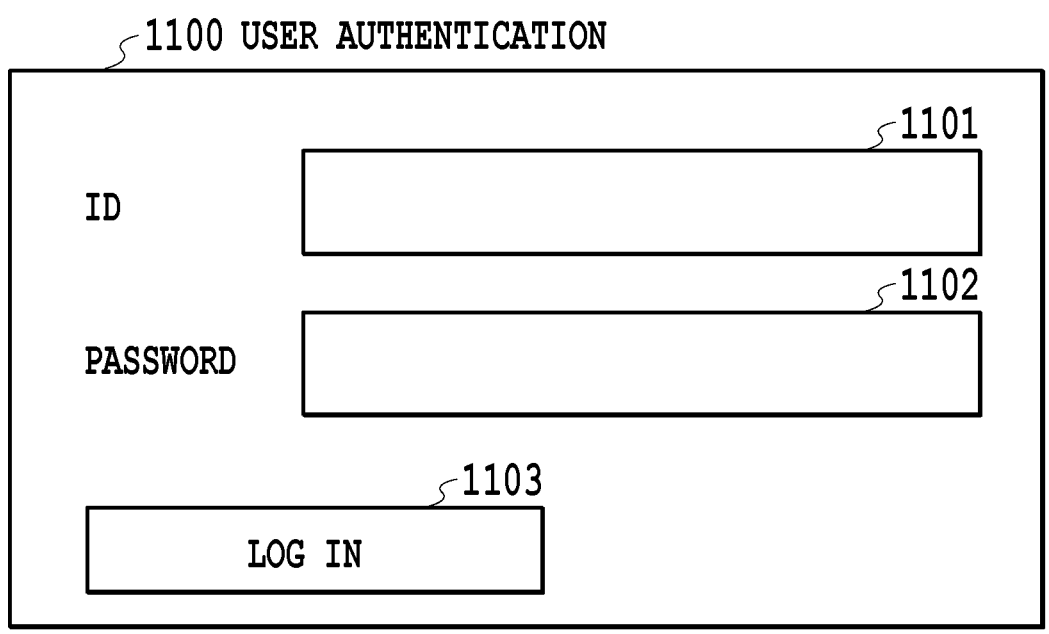
FIG. 11 is a diagram showing an example of a user authentication screen of the image forming apparatus in the first embodiment.

FIG. 11 shows an example of a user authentication screen of the image forming apparatus 102 in the present embodiment. A user authentication screen 1100 is displayed on the operation unit 207 by the CPU 202 of the image forming apparatus 102 executing the system software 301. A user makes a user authentication request to the authentication unit 303 by inputting a user ID and a password to a user ID input area 1101 and a password input area 1102, respectively, and pressing down a Log in button 1103 on the user authentication screen 1100. The authentication unit 303 performs user authentication based on the information input on the user authentication screen 1100 and performs arbitrary processing in accordance with the results of the user authentication. Details of the user authentication processing are not important in the present embodiment, and therefore, detailed explanation is omitted. Further, according to an embodiment of the present invention, it is possible for the storage control unit 305 to store the password input to the password input area 1102 and to use the password for decoding of an encrypted print job. Furthermore, for the user authentication in the image forming apparatus 102, it may also be possible to use an authentication device capable of card authentication, mobile authentication, fingerprint authentication, face authentication, and so on.

(Post-Login Automatic Printing Processing)

Figure 12:
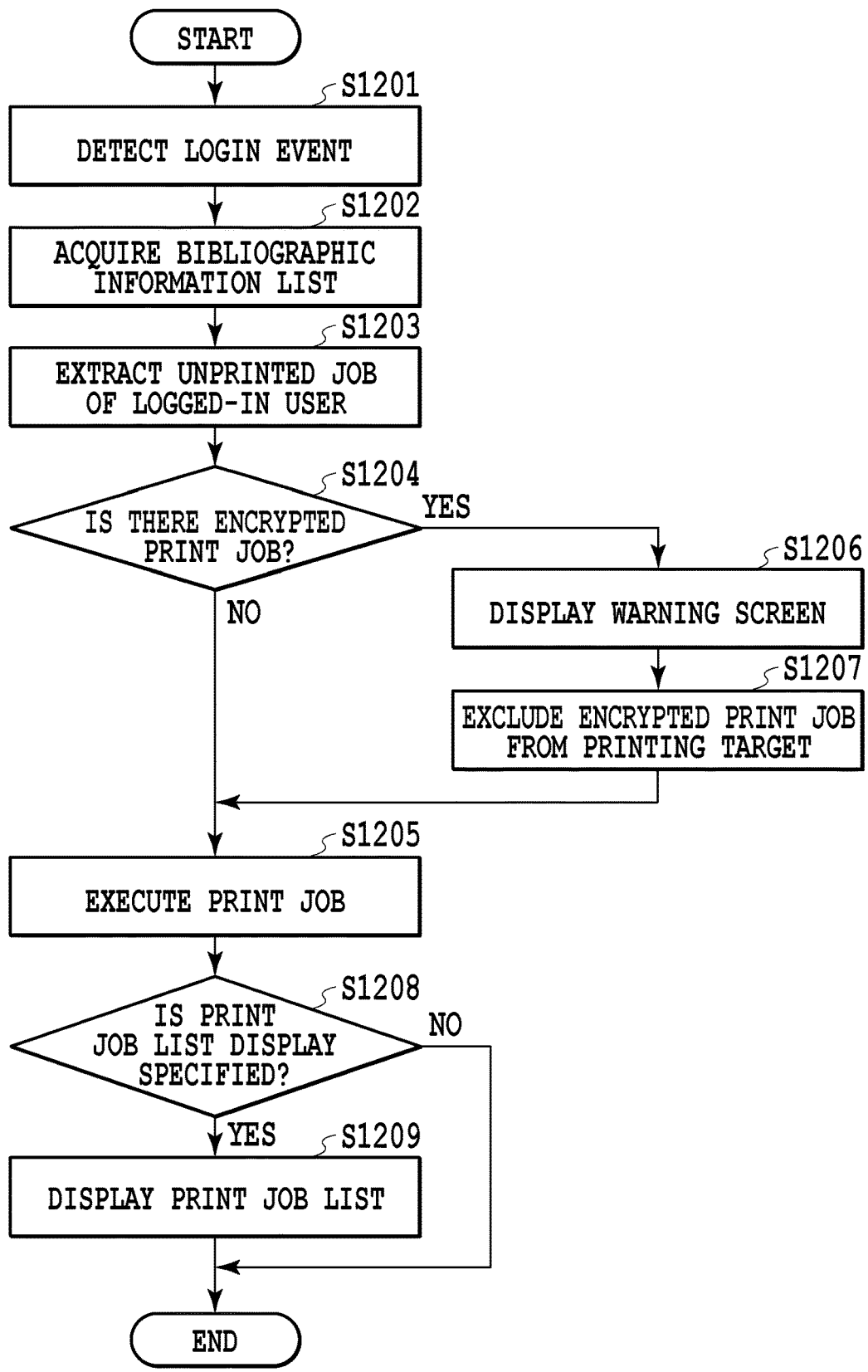
FIG. 12 is a flowchart explaining post-login automatic printing processing in the first embodiment.

FIG. 12 shows a flowchart explaining post-login automatic printing processing in the present embodiment. This processing is performed by the image forming apparatus 102, i.e., by the CPU 202 of the image forming apparatus 102 executing the system software 301.

First, at step S1201, the authentication unit 303 of the image forming apparatus 102 detects that a user has performed user authentication on the user authentication screen 1100 and has succeeded in the user authentication and logged in (login event). In the case where the login event is detected, at step S1202, the job management unit 307 acquires the bibliographic information list 1000 from the storage control unit 305. The bibliographic information list 1000 is a bibliographic information list including bibliographic information corresponding to print jobs held in the image forming apparatus 102.

Next, at step S1203, the job management unit 307 extracts a print job, which is a printing target of the logged-in user, from the acquired bibliographic information list 1000. In the present embodiment, the job management unit 307 extracts bibliographic information whose User name 1002 coincides with the logged-in user and whose Printed flag 1006 is "unprinted" from the bibliographic information list 1000, and generates a bibliographic information list including the extracted bibliographic information. That is, the job management unit 307 also functions as a bibliographic information list generation unit. The print job corresponding to bibliographic information whose Printed flag 1006 is "unprinted" means an unprinted job not executed even once. Referring to FIG. 10, in the case where the logged-in user ID is "Kaneko", from the bibliographic information list 1000, the bibliographic information 1009 to 1012 is extracted. FIG. 13 shows a bibliographic information list 1300 generated by extracting unprinted jobs of the logged-in user. The bibliographic information 1009 to 1012 in the bibliographic information list 1300 is the same as the bibliographic information 1009 to 1012 in the bibliographic information list 1000.

Figure 14:
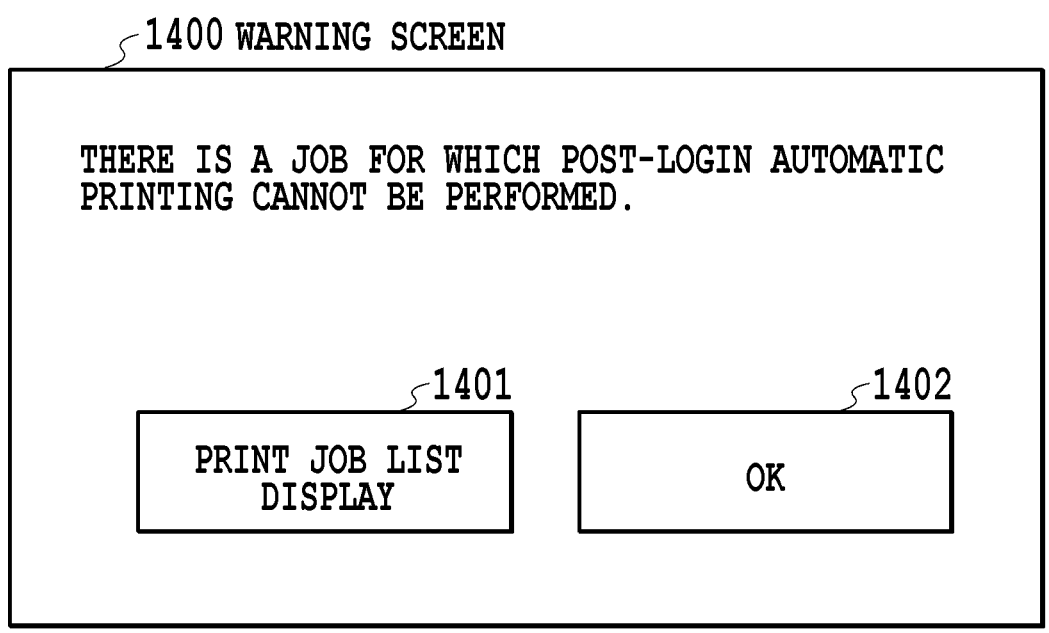
FIG. 14 is a diagram showing an example of a warning screen of post-login automatic printing processing in the first embodiment.

Next, at step S1204, the job management unit 307 determines whether an encrypted print job is included in the bibliographic information list 1300 by Job type 1305 of the bibliographic information list 1300. In the case where an encrypted print job is included, the processing advances to step S1206 and the job management unit 307 displays a warning screen on the operation unit 207 via the UI control unit 302. That is, the job management unit 307 also functions as a warning screen display unit. FIG. 14 shows an example of a warning screen 1400 in the present embodiment. In the present embodiment, in the post-login automatic printing processing, an encrypted print job is not executed, and therefore, the warning screen 1400 produces a display to the effect that an encrypted print job that cannot be printed automatically is included in the unprinted print jobs of the logged-in user. The warning screen 1400 includes a Print job list display button 1401 and an OK button 1402. In the case where the Print job list display button 1401 is pressed down by the user, the job management unit 307 stores that a print job list display has been specified. After executing the non-encrypted print jobs in the subsequent processing, the job management unit 307 displays a print job list including the encrypted print jobs that are not executed on the operation unit 207 via the UI control unit 302 based on the stored specification of the print job list display. The print job list will be described later with reference to FIG. 17. On the other hand, in the case where the OK button is pressed down by the user, the print job list including the encrypted print jobs is not displayed. In either case, on a condition that the user presses down the Print job list display button 1401 or the OK button 1402 on the warning screen 1400, the processing advances to step S1207.

At step S1207, the job management unit 307 excludes the encrypted print jobs from the target of the post-login automatic printing processing. Specifically, the job management unit 307 generates a bibliographic information list obtained by removing the encrypted print jobs from the bibliographic information list 1300. FIG. 15 shows an example of a bibliographic information list 1500 generated by removing the encrypted print jobs in the present embodiment. As shown schematically, the bibliographic information list 1500 includes the bibliographic information 1009 and 1010 on the non-encrypted print jobs and from the bibliographic information list 1300, the bibliographic information 1011 and 1012 on the non-encrypted print jobs has been removed.

In the case where it is determined that no encrypted print job is included in the bibliographic information list 1300 at step S1204, or following step S1207, the processing advances to step S1205.

At step S1205, the job management unit 307 executes the print jobs shown in the bibliographic information list 1300 of the unprinted jobs of the logged-in user extracted at step S1203. In the case where an encrypted print job is included in the bibliographic information list 1300, the job management unit 307 executes the print jobs shown in the bibliographic information list 1500 generated by removing the encrypted print jobs at step S1207. The print jobs are performed in the order from the top print job in the bibliographic information lists 1300 and 1500 in which the print jobs are arranged in order. For example, the print jobs are performed in the ascending order of Date and time 1301 at which the print job is input. Further, the job management unit 307 changes Printed flag 1306 of the executed print job to "printed".

FIG. 16 shows a bibliographic information list 1600 after the print jobs have been executed in the present embodiment. Upon the completion of the execution of the print jobs, as shown in FIG. 16, Printed flag of bibliographic information 1609 and 16010 in the bibliographic information list 1600 is changed from "unprinted" to "printed". By changing Printed flag from "unprinted" to "printed", it is possible to exclude the print job printed once from the target of post-login automatic printing. Bibliographic information 1607, 1608, 1611, and 1612 in the bibliographic information list 1600 is the same as the bibliographic information 1007, 1008, 1011, and 1012 in the bibliographic information list 1100.

Next, at step S1208, the job management unit 307 determines whether a user has pressed down the Print job list display button 1401 on the warning screen 1400 to specify a print job list display. In the case where a print job list display has been specified, the processing advances to step S1209 and the job management unit 307 displays the print job list of the user.

FIG. 17 shows a display screen of a print job list 1700 in the present embodiment. The print job list 1700 includes "printed" print jobs 1701 to 1703 and "unprinted" print jobs 1704 and 1705 of a logged-in user. That is, on the display screen of the print job list 1700, a print job list including all the print jobs whose logged-in user ID is "Kaneko" is displayed. Further, the display screen of the print job list 1700 includes a Delete button 1710 and a Print button 1711. It is possible for the user to delete a print job selected from the print job list 1700 by selecting the print job and pressing down the Delete button 1710. Further, it is possible for the user to execute a selected print job and to perform printing processing by selecting the print job and pressing down the Print button 1711. In the case where the print job to be executed is an encrypted print job, it is possible to decode the encrypted print job and to execute the print job by using the password or the login password of the user input from by the user to decode and execute the encrypted print job. That is, the display screen of the print job list 1700 can display an encrypted print job in such a manner that the user can select the encrypted print job in order to execute the encrypted print job not executed at step S1205.

After displaying the print job list 1700, the job management unit 307 terminates the processing.

On the other hand, in the case where it is determined that the print job list display has not been specified at step S1208, the job management unit 307 terminates the processing without displaying the print job list on the display screen. That is, in the case where the OK button 1402 is pressed down by the user on the warning screen 1400 or in the case where it is determined that no encrypted print job is included at step S1204, the job management unit 307 terminates the processing without displaying the display screen of the print job list.

As explained above, the image forming apparatus according to the present embodiment includes the automatic print function after the login of a user and it is possible to perform post-login automatic printing processing in the state where both the encrypted print job and the non-encrypted print job are held. That is, according to the present embodiment, it is possible to control an encrypted print job at the time of performing post-login automatic printing processing. Further, in the case where an encrypted print job is held, it is possible for the image forming apparatus to prevent the encrypted print job from being printed by notifying a user of that and warning the user. Furthermore, by making it possible to execute a print job selected by a user by displaying a print job list including an encrypted print job after performing post-login automatic printing, it is possible for the image forming apparatus to reduce the printing burden for the print job that is held after login.

Second Embodiment

In the above-described first embodiment, explanation is given to the post-login automatic printing processing to automatically execute, in the case where an encrypted print job and a non-encrypted print job are held, only the non-encrypted print job. In the post-login automatic printing processing such as this, only part of the print jobs that are held (e.g., non-encrypted print job) is executed automatically, and therefore, the print jobs are not necessarily executed in the order of arrangement within a bibliographic information list and the execution order of print jobs is not guaranteed. Consequently, in the present embodiment, processing is explained that enables printing of both an encrypted print job and a non-encrypted print job by the series of processing at the time of login by executing those print jobs in the order of arrangement within a bibliographic information list in the case where the encrypted print job and the non-encrypted print job are held. The configurations of the network, the image forming apparatus, the PC, and so on, according to the present embodiment are the same as those of the first embodiment, and therefore, detailed explanation is omitted. In the following, only the processing at the time of login is explained.

Figure 18:
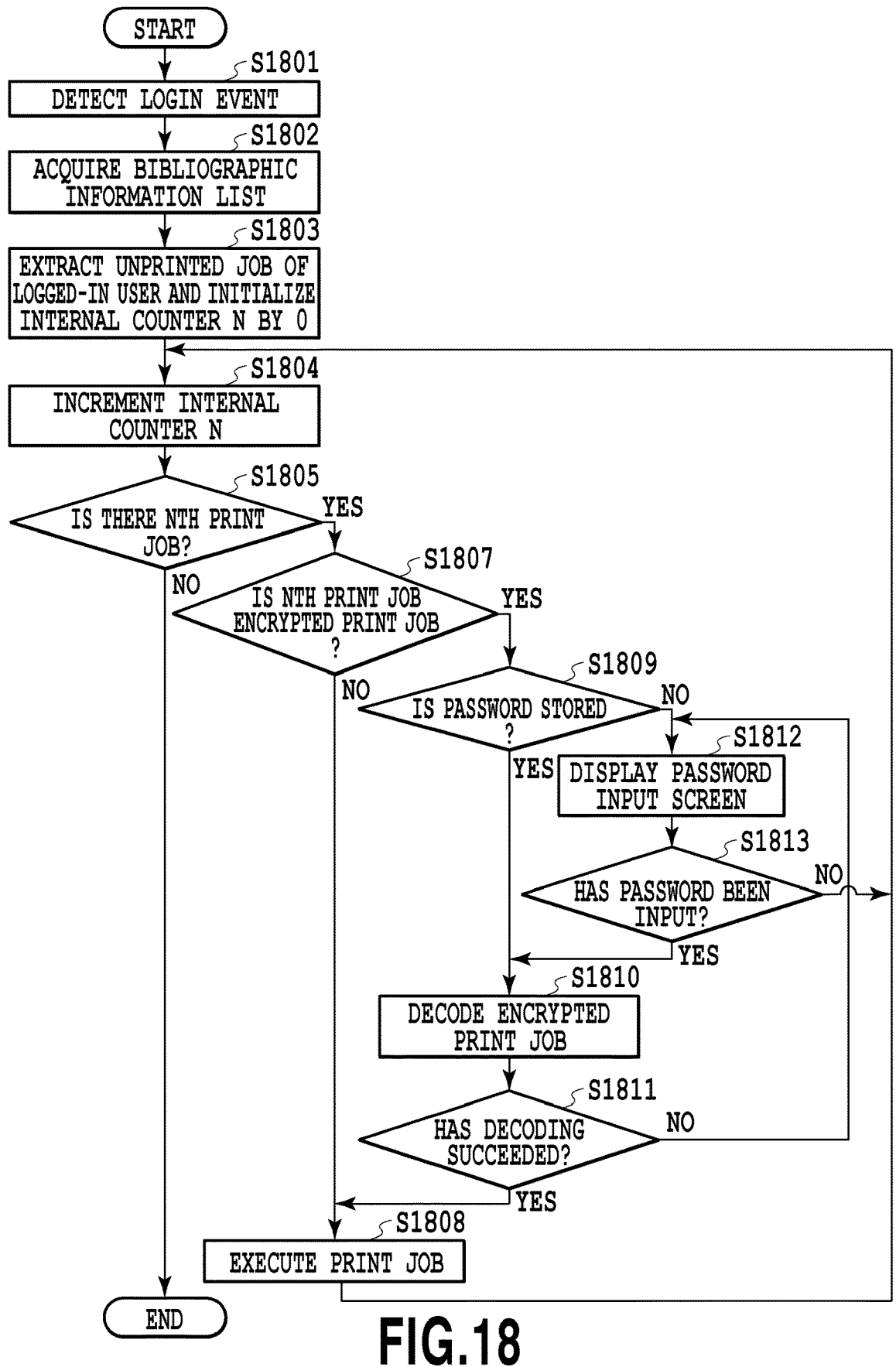
FIG. 18 is a flowchart explaining post-login automatic printing processing in a second embodiment.

FIG. 18 shows a flowchart explaining post-login automatic printing processing in the present embodiment. This processing is performed by the image forming apparatus 102, i.e., by the CPU 202 of the image forming apparatus 102 executing the system software 301.

First, at step S1801, the authentication unit 303 of the image forming apparatus 102 detects that a user has performed user authentication on the user authentication screen 1100 to login (login vent). Upon detecting a login event, the job management unit 307 acquires the bibliographic information list 1000 from the storage control unit 305 at step S1802.

Next, at step S1803, the job management unit 307 extracts the printing-target print jobs of the logged-in user from the acquired bibliographic information list 1000 and generates a bibliographic information list. That is, the job management unit 307 also functions as a bibliographic information list generation unit. Further, the job management unit 307 initializes an internal counter N by 0. In the present embodiment, the job management unit 307 extracts the bibliographic information whose User name 1002 coincides with the logged-in user and whose Printed flag 1006 is "unprinted" from the bibliographic information list 1000 and initializes the internal counter N by 0. For example, in the case where the logged-in user is "Kaneko", from the bibliographic information list 1000, the bibliographic information 1009 to 1012 is extracted. FIG. 13 shows the bibliographic information list 1300 generated by extracting the unprinted jobs of the logged-in user. The bibliographic information 1009 to 1012 in the bibliographic information list 1300 is the same as the bibliographic information 1009 to 1012 in the bibliographic information list 1000. In the present embodiment, it is assumed that in the bibliographic information lists 1000 and 1300, the print jobs are arranged in the ascending order of Date and time (the print job with the oldest Date and time is arranged at the top in the list).

Next, at step S1804, the job management unit 307 increments the internal counter N (i.e., increases the value of N by 1). At step S1805, the job management unit 307 determines whether the Nth print job exists in the bibliographic information list 1300. In the case of determining that the Nth print job does not exist, the job management unit 307 terminates the processing. On the other hand, in the case of determining that the Nth print job exists, the job management unit 307 advances the processing to step S1807 and determines whether or not the Nth print job is an encrypted print job by Job type 1305.

In the case where the Nth print job is not an encrypted print job (the Nth print job is a non-encrypted print job), the processing advances to step S1808 and the job management unit 307 performs printing processing by executing the Nth print job. Further, the job management unit 307 changes Printed flag 1306 of the bibliographic information on the executed Nth print job to "printed". Following this, the processing returns to step S1804.

On the other hand, in the case where it is determined that the Nth print job is an encrypted print job at S1807, the processing proceeds to step S1809 and the job management unit 307 determines whether the already input password to decode the encrypted print job is stored. In the present embodiment, it may also be possible to use the password for user authentication that a user has input to the password input area 1102 on the user authentication screen 110 as a decoding password of the encrypted print job. Further, in the present embodiment, it may also be possible to use the password that a user has input at step S1812, to be described later, as a decoding password of the encrypted print job.

In the case where it is determined that the password is stored at step S1809, the processing advances to step S1810 and the job management unit 307 decodes the encrypted print job by using the stored password. At step S1810, the job management unit 307 determines whether the decoding of the encrypted print job has succeeded. In the case where the decoding has succeeded, the processing advances to step S1808 and the job management unit 307 performs printing processing by executing the Nth print job and at the same time, changes Printed flag 1306 of the bibliographic information to "printed" and the processing returns to step S1804.

Figure 19:
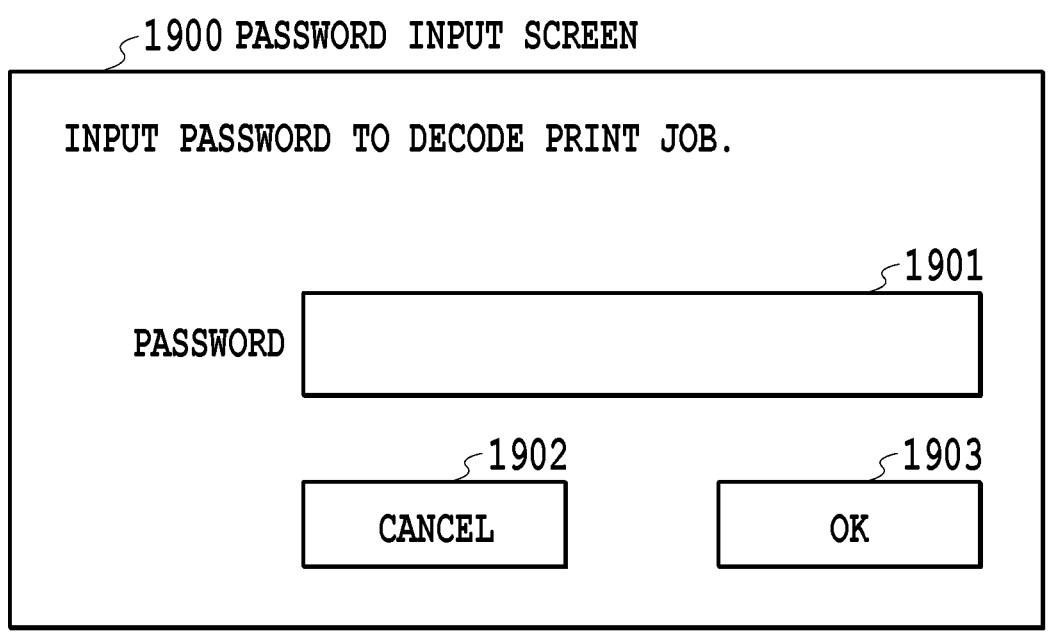
FIG. 19 is a diagram showing an example of a decoding password input screen of an encrypted print job in the second embodiment.

On the other hand, in the case where it is determined that the password is not stored at step S1809, or in the case where the decoding has failed at step S1810, the processing advances to step S1812. At step S1812, the job management unit 307 displays a password input screen to decode the encrypted print job via the UI control unit 302. FIG. 19 shows an example of a password input screen 1900 to decode the encrypted print job in the present embodiment. A user inputs a password to a password input area 1901 on the password input screen 1900 and presses down an OK button 1903.

At step S1813, the job management unit 307 determines whether a password has been input. In the case where a password has been input, the processing advances to step S1810 and the job management unit 307 decodes the encrypted print job by using the input password. It may also be possible for the job management unit 307 to store the input password and to use the password to decode the next encrypted print job.

On the other hand, in the case where a user presses down a Cancel button 1902 on the password input screen 1900 and no password is input, the processing returns to step S1804. That is, in the case where no password is input, the encrypted print job is not executed and the processing moves to the next print job.

As explained above, the image forming apparatus according to the present embodiment includes the automatic printing function after login of a user and is able to perform post-login automatic printing processing in the state where both an encrypted print job and a non-encrypted print job are held. That is, according to the present embodiment, it is possible to control an encrypted print job at the time of performing post-login automatic printing processing. Further, in the case where an encrypted print job is held, it is possible for the image forming apparatus to perform printing processing by decoding the encrypted print job by using the password that is input in the series of processing relating to login. Furthermore, it is possible for the image forming apparatus to execute print jobs in the order of arrangement within a bibliographic information list and to guarantee the execution order of print jobs.

(Other Network Configuration)

Figure 20:
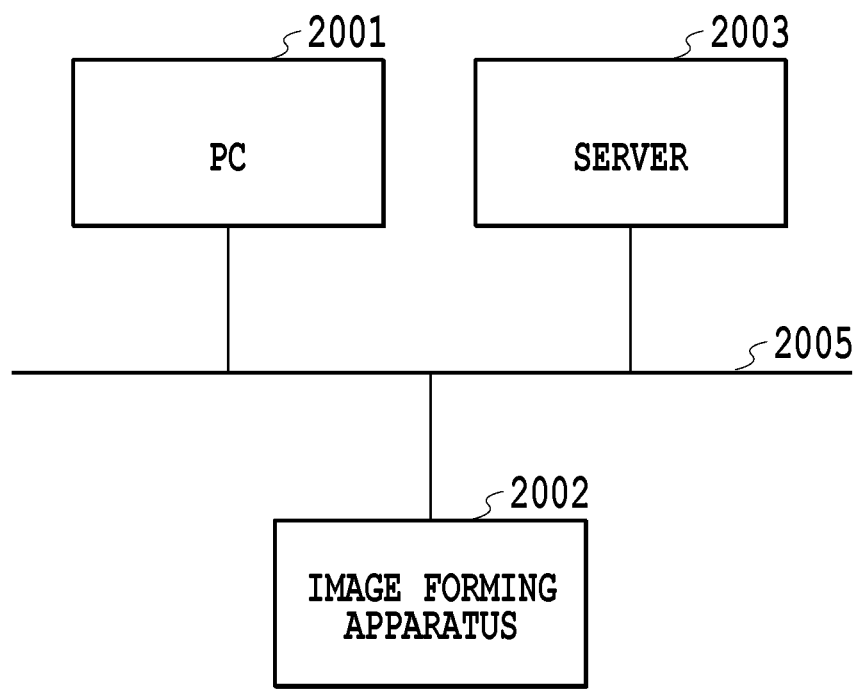
FIG. 20 is a diagram showing an example of another network configuration in the first and second embodiments.

FIG. 20 shows an example of another network configuration in the above-described first and second embodiments. To a LAN 2005, in addition to a personal computer (PC) 2001 that inputs a print job and an image forming apparatus 2002 that processes a print job, a server 2003 that saves a print job that is input from the PC 2001 is connected. It is possible for the server 2003 to function as a so-called print server, to save a print job received from the PC 2001 and another apparatus or device, and to provide the image forming apparatus 2002 with the print job. It is possible for the image forming apparatus 2002 to perform the processing in the above-described first and second embodiments while performing transmission and reception of information with the PC 2001 and the server 2003. According to the present network configuration, it is not necessary for a print job to be saved in the image forming apparatus 2002. Further, the PC 2001 may be an apparatus or a device (e.g., mobile terminal, another image forming apparatus, and so on) other than a PC.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is made possible to control an encrypted print job at the time of performing post-login automatic printing processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-124572 filed Jun. 23, 2016, which is hereby incorporated by reference wherein in its entirety.

What is claimed is:

1. A printing apparatus comprising: one or more memories that store one or more print jobs in association with a user information indicating a job owner, and wherein the one or more print jobs supported by the printing apparatus and storable in the one or more memories includes at least a first type print job requiring a password input operation from a user in printing and a second type print job not requiring the password input operation from the user in printing; a printer that prints an image on a sheet; and one or more processors that execute a set of instructions to: detect a user login to the printing apparatus; specify print jobs corresponding to the logged-in user from among the one or more print jobs stored in the one or more memories; specify an unprinted print job to be automatically printed from among the specified print jobs corresponding to the logged-in user at least based on job types of the specified print jobs; and in response to the detection of the user login, start processing for the unprinted print job to be automatically printed, wherein execution of the processing for the unprinted print job causes printing by the printer based on page data constituting the unprinted print job, wherein at least the first type print job is not to be automatically printed, wherein the one or more memories are configured to further store a reprintable print job printed one or more times by the printing apparatus in the print processing, wherein in response to the detection of the user login, even if the reprintable print job in association with the logged-in user has been stored in the one or more memories, the reprintable print job is not printed.

2. The printing apparatus according to claim 1, wherein the first type of print job is an encrypted print job in which at least one or more page data constituting a print job is encrypted, wherein the encrypted print job is printed in a case where after a user logs in the printing apparatus, the password input operation is received from the logged-in user and decoding of the encrypted page data using information obtained by the input operation succeeds.

3. The printing apparatus according to claim 1, wherein the second type of print job is a non-encrypted print job.

4. The printing apparatus according to claim 1, further comprising an operation unit, wherein the one or more processors are configured to execute a set of instructions to:
display, on the operation unit, selectably a list of the print job stored in association with the logged-in user, wherein in a case where both of the first type of print job and the second type of print job are stored in association with the logged-in user, both print jobs are displayed in the list;
receive, from the operation unit, a print instruction of a print job selected from the displayed list from the logged-in user; and
print the selected print job in accordance with the print instruction.

5. The printing apparatus according to claim 1, further comprising an operation unit, wherein the first type of print job is an encrypted print job in which at least one or more page data constituting a print job is encrypted, and wherein the one or more processors are configured to execute a set of instructions to:
display, on the operation unit, an input screen to input a password in a case where the selected print job is an encrypted print job; and
decode the encrypted page data of the encrypted print job based on the password input by the user over the input screen and printing based on the decoded print page is performed according to decoding of the encrypted page data.

6. The printing apparatus according to claim 1, further comprising an operation unit, wherein the one or more processors are configured to execute a set of instructions to:
display, on the operation unit, a screen including a display item for transitioning to a selection list for selecting a print job to be printed, according to the user login, in a case where there are one or more unprinted jobs excluding from the target of printing processing caused by the detection of the user login.

7. The printing apparatus according to claim 6,
wherein in a case where there are no unprinted jobs excluding from the target of printing processing caused by the detection of the user login, even if one or more reprintable print jobs printed one or more times by the printing apparatus have been stored, the display item is not displayed.

8. A control method of a printing apparatus that can perform printing processing based on one or more print jobs stored in association with a user information indicating a job owner, wherein the one or more print jobs supported by the printing apparatus and storable in the one or more memories includes at least a first type print job requiring a password input operation from a user in printing and a second type print job not requiring the password input operation from the user in printing, the method comprising the steps of: detecting a user login to the printing apparatus; and specifying print jobs corresponding to the logged-in user from among the one or more print jobs stored in the one or more memories; specifying an unprinted print job to be automatically printed from among the specified print jobs corresponding to the logged-in user at least based on job types of the specified print jobs; and in response to the detection of the user login, starting processing for the unprinted print job to be automatically printed, wherein execution of the processing for the unprinted print job causes printing by the printer based on page data constituting the unprinted print job, wherein at least the first type print job is not to be automatically printed, wherein a reprintable print job printed one or more times by the printing apparatus in the print processing is stored in the one or more memories, wherein in response to the detection of the user login, even if the reprintable print job in association with the logged-in user has been stored in the one or more memories, the reprintable print job is not printed.

9. The control method according to claim 8, further comprising the steps of:
storing a bibliographic information including at least an identification information of the print job, an identification information of a user that input the print job and a job type information that indicates the type of print job;
wherein the unprinted print job to be automatically printed is specified by extracting an unprinted print job in which the identification information of the user corresponds to an identification information of the logged-in user and the job type information does not correspond to a type of the first type print job, using the stored bibliographic information.

10. The control method according to claim 9, wherein the bibliographic information further includes an information that indicates whether the print job is printed.

11. The control method according to claim 8, wherein the first type of print job is an encrypted print job in which at least one or more page data constituting a print job is encrypted,
wherein the method further comprising the steps of:
displaying selectably a list of the print job stored in association with the logged-in user, wherein in a case where both of the first type of job and the second type of print job are stored in association with the logged-in user, both print jobs are displayed in the list;
receiving a print instruction of a print job selected from the displayed list from the logged-in user; and
printing the selected print job in accordance with the print instruction.

12. The control method according to claim 11, further comprising the steps of:
displaying an input screen to input a password in a case where the selected print job is an encrypted print job;
decoding the encrypted page data of the encrypted print job based on the password input by the user over the input screen and printing based on the decoded print page is performed according to decoding of the encrypted page data.

13. The control method according to claim 8, further comprising the steps of:
in a case where there are one or more unprinted jobs excluding from the target of printing processing caused by the detection of the user login, displaying a display item for transitioning to a selection list for selecting a print job to be printed on a screen displayed according to the user login.

14. The control method according to claim 13, wherein the one or more print jobs further includes a reprintable print job printed one or more times by the printing apparatus,
in the step of printing in response to the detection of the user login, even if the reprintable print job in association with the logged-in user has been stored, the reprintable print job is not printed.

15. The control method according to claim 14, wherein in a case where there are no unprinted jobs excluding from the target of printing processing caused by the detection of the user login, even if one or more reprintable print jobs printed one or more times by the printing apparatus have been stored, the display item is not displayed.

16. The control method according to claim 13, wherein even in a case where the first type print job corresponding to the logged-in user is stored in the one or more memories, an input screen to input a password necessary for execution of the first type print job is not displayed in conjunction with the user login.

17. The control method according to claim 8, wherein
the print job is stored in one or more memories of the printing apparatus.

18. The control method according to claim 8, wherein
the print job is stored in an external storage device.

19. A non-transitory computer readable storage medium storing a program for causing a computer to perform a control method of a printing apparatus that can perform printing processing based on one or more print jobs stored in association with a user information indicating a job owner, wherein the one or more print jobs supported by the printing apparatus and storable in the one or more memories includes at least a first type print job requiring a password input operation from a user in printing and a second type print job not requiring the password input operation from the user in printing, the method comprising the steps of: detecting a user login to the printing apparatus; and specifying print jobs corresponding to the logged-in user from among the one or more print jobs stored in the one or more memories; specifying an unprinted print job to be automatically printed from among the specified print jobs corresponding to the logged-in user at least based on job types of the specified print jobs; and in response to the detection of the user login, starting processing for the unprinted print job to be automatically printed, wherein execution of the processing for the unprinted print job causes printing by the printer based on page data constituting the unprinted print job, wherein at least the first type print job is not to be automatically printed, wherein a reprintable print job printed one or more times by the printing apparatus in the print processing is stored in the one or more memories, wherein in response to the detection of the user login, even if the reprintable print job in association with the logged-in user has been stored in the one or more memories, the reprintable print job is not printed.

* * * * *